(No Model.)
G. P. SCHMIDT.
SAFETY COVER FOR KEY NOSES.
No. 399,570. Patented Mar. 12, 1889.
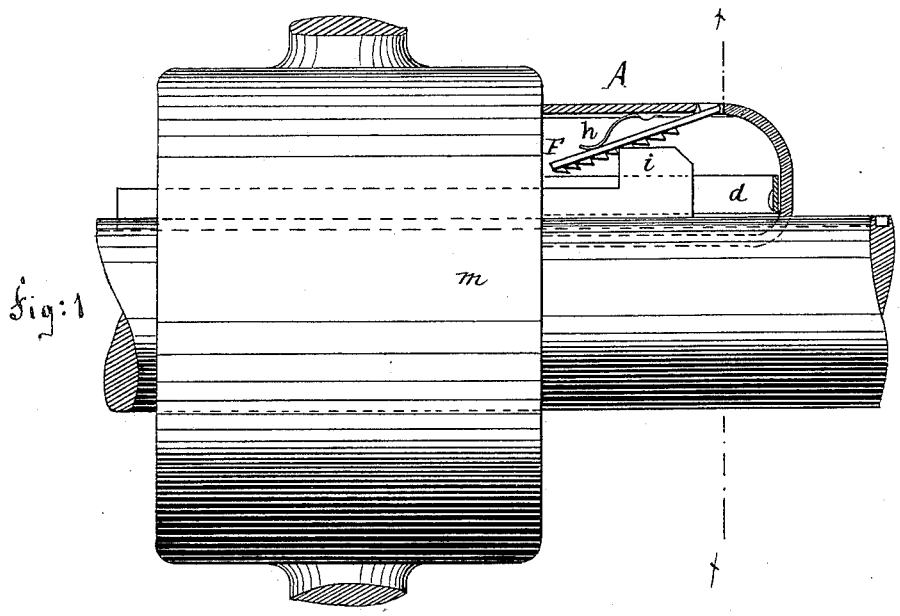
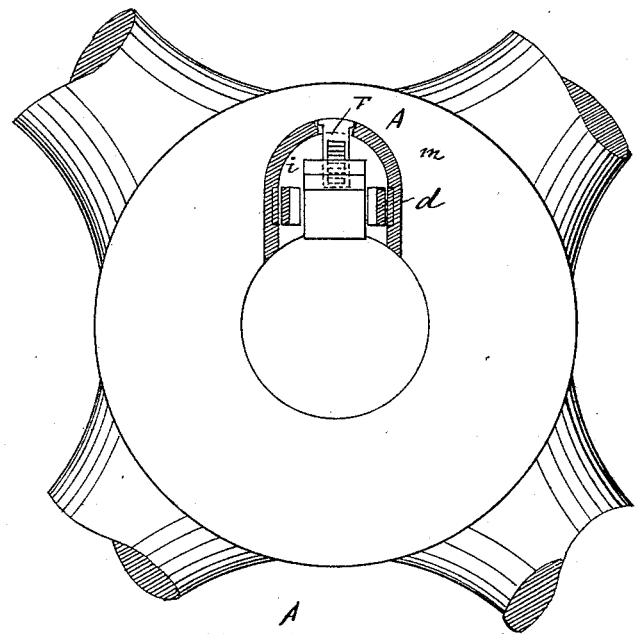
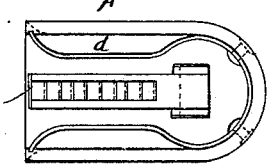
WITNESSES:
INVENTOR:
Gottlieb Paul Schmidt
BY
Goepel & Raegener
ATTORNEYS.

UNITED STATES PATENT OFFICE.

GOTTLIEB PAUL SCHMIDT, OF SCHMIEDEBERG, SAXONY, GERMANY.

SAFETY-COVER FOR KEY-NOSES.

SPECIFICATION forming part of Letters Patent No. 399,570, dated March 12, 1889.

Application filed December 2, 1887. Serial No. 256,746. (No model.) Patented in Germany September 8, 1886, No. 39,266.

*To all whom it may concern:*

Be it known that I, GOTTLIEB PAUL SCHMIDT, of Schmiedeberg, in the Kingdom of Saxony and Empire of Germany, have invented certain new and useful Improvements in Safety-Covers for Key-Noses, (which has been patented to me in Germany, dated September 8, 1886, No. 39,266,) of which the following is a specification.

This invention relates to an improved safety device for covering the key-noses of pulleys, wheels, &c., so that any danger of accident by said projecting noses is prevented; and the invention consists of a safety-cover for the key-noses of shafts, which is provided with an interior U-shaped spring for engaging the key, and with a spring-actuated rack at the top part that engages the projecting key-nose, as will more fully appear hereinafter, and be finally pointed out in the claim.

In the accompanying drawings, Figure 1 represents a vertical longitudinal section of my improved safety-cover for key-noses of shafts, showing the same applied in position on the key. Fig. 2 is a vertical transverse section of the same on line $x\ x$, Fig. 1; and Fig. 3 is a bottom view of the safety-cover.

Similar letters of reference indicate corresponding parts.

In the drawings, A represents the U-shaped cover of suitable material, which is closed at the top, sides, and at one end, and open at the opposite end and the bottom, it being made of sufficient size to extend over the projecting portion of the key and to inclose the same entirely. To the inner surface of the side walls and closed end of the cover A is applied a U-shaped band-spring, $d$, the free ends of which are curved outwardly, and the shanks of which serve to press on the sides of the key, so as to retain the cover in position on the shaft.

To the top opening of the cover A is applied a toothed rack, F, the upper end of which is pivotally connected with the cover A, while the toothed portion is pressed downward by a spring, $h$, attached to the under side of the cover A, the teeth of the rack serving to engage the inner end of the top edge of the key-nose $i$, as shown in Fig. 1.

The width of the cover A and the tension of the clamping-spring $d$ are proportioned in such a manner that the cover can be used for different sizes of keys within a certain diameter of shaft. The locking action exerted by the rack on the key-nose prevents the detaching of the cover in case the belt in slipping off from the pulley should move over the cover and tend to detach the same.

For the purpose of detaching the cover, so as to get at the key, the cover is taken hold of at the outer end and lifted upward away from the shaft, so that the spring $d$ releases the key and the rack F the nose of the same.

For applying the cover, all that is necessary is to place the cover on the shaft in line with the key and move the same forward toward the hub $m$ of the pulley or gear-wheel until the open end of the cover abuts against said hub, whereby the spring $d$ takes hold of the sides of the key and the rack F on the key-nose $i$, thereby retaining the cover reliably in position on the shaft.

Having thus described my invention, I claim as new and desire to secure by Letters Patent—

A safety-cover for the key-noses of shafts, composed of a covering-box provided with an interior U-shaped spring pressing against the sides of the key, and with a pivoted and spring-actuated rack that engages the nose of the key, substantially as set forth.

In testimony that I claim the foregoing as my invention I have signed my name in presence of two subscribing witnesses.

GOTTLIEB PAUL SCHMIDT.

Witnesses:
ADOLPH PRAETORIUS,
ALFRED KLEEBERG.